3,827,941
MICROBIAL CONVERSION OF 11-ACETYL-
ERYTHROMYCIN B TO ERYTHROMYCIN B
Robert John Theriault, Kenosha, Wis., and William
Leonard Kohl, Spring Grove, Ill., assignors to Abbott
Laboratories, North Chicago, Ill.
No Drawing. Filed Oct. 2, 1972, Ser. No. 294,061
Int. Cl. C12b 1/00
U.S. Cl. 195—80                    1 Claim

ABSTRACT OF THE DISCLOSURE

Covers a method of performing the microbial conversion of 11-acetylerythromycin B to erythromycin B.

DESCRIPTION OF THE INVENTION

This invention relates to a method of carrying out the microbial conversion of 11-acetylerythromycin B to erythromycin B.

Erythromycin is produced in two forms denoted A and B by cultivating a strain of *Streptomyes erythreus* in a suitable nutrient medium as is taught in U.S. 2,653,899 Bunch et al. The structure of erythromycin B is represented by the following formula:

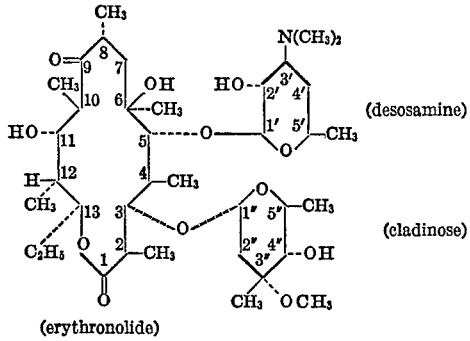

(erythronolide)

Erythromycin B, as will be noted from the formula, comprises three cyclic fragments. These fragments are referred to respectively as cladinose, desosamine and erythronolide. The positions on the cladinose ring are indicated by double primed numbers; the positions on the desosamine ring by single primed numbers; while positions on the erythronolide ring are indicated by unprimed numbers.

Continual efforts are being carried out to improve the efficacy of erythromycin B by preparing derivatives thereof. However, in many cases it is necessary to first put blocking groups at the functional sites of erythromycin B prior to synthesizing the desired derivative. These blocking groups permit further synthesis without chemical involvement of the sites already so blocked. The blocking groups are then removed by various means and the sought-after derivatives are isolated. In some cases when one attempts to remove chemically the blocking group or groups, the other sites of the molecule react with the chemical used to unblock the desired reaction site, resulting in undesirable mixtures with a consequent lowering of yield of the compound sought to be synthesized. In yet other cases, the blocking group is removed chemically only with difficulty, again leading to lower yields.

The present invention comprises a method of selectively deacetylating the 11 position on the erythronolide ring of 11-acetylerythromycin B or derivative of erythromycin B having an acetyl group in the 11 position, without disturbing other functional groups on the erythromycin B molecule. The 11-O-acetyl group then is converted back to an 11-hydroxy group of either erythromycin B itself or any derivative thereof.

Thus by the use of the term "11-acetylerythromycin B" or "erythromycin B" is meant the two compounds per se or any derivative thereof, as long as in the first instance the 11 position of the erythromycin B is substituted by an 11-O-acetyl group, and in the second instance the 11 position in the erythromycin B molecule is a hydroxy group.

In more detail, the microbial conversion of 11-acetylerythromycin B to erythromycin B is carried out by inoculating the culture *Streptosporangium vulgare* S-1 NRRL-2633 into a suitable fermentation medium and allowing sufficient time to permit growth. The 11-acetylerythromycin B substrate or erythromycin B derivative is then added to the growing culture and sufficient time is allowed to permit the conversion to the corresponding erythromycin B compound or derivative thereof to take place where the 11 position is now hydroxy. Erythromycin B or the erythromycin B derivative is then isolated. Thus, by this method the 11-O-acetyl group of an erythromycin B derivative is deacetylated back to the normal hydroxyl group.

The notation "NRRL" indicates the culture of this organism has been placed on deposit with the Northern Utilization Research & Development Division, Department of Agriculture, Peoria, Ill.

Suitable growth media for the above microorganism comprises assimilable sources of carbon, nitrogen, defoamers and buffers. Examples of such nitrogen sources include soybean flour, yeast extract, cornmeal, oatmeal, meal extracts, distillers' solubles, protein hydrolysates, peptones, amino acids, urea, nitrates, ammonium compounds. Carbohydrates, especially monosaccharides can be used as a carbon source and include glucose, fructose, sucrose, maltose, lactose, molasses, dextrines, and starches.

A typical fermentation medium used in this process contains the following ingredients:

| Ingredients: | G./liter |
|---|---|
| Glucose monohydrate (added post sterilization) | 50.0 |
| Soy bean grits | 5.0 |
| Yeast extract | 2.5 |
| NaCl | 1.0 |
| $KH_2PO_4$ | 1.0 |
| $K_2HPO_4$ | 2.0 |

Adjust pH to 7.0 and add deionized water to 1.0 liter.

The following examples illustrates the process of the invention:

EXAMPLE I

*Streptosporangium vulgare* S-1 NRRL-2633 was inoculated from 14 day incubated agar slants cultures into a series of sterile, cotton-plugged, 500 ml. Erlenmeyer flasks containing 100 ml. of the fermentation medium set out above. These seed flasks were incubated on a Gump rotary shaker (250 r.p.m.) at 28° C. for 168 hours. At that time 100 identical sterile, cotton-plugged 500 ml. Erlenmeyer flasks, each containing 100 ml. of the fermentation medium were each inoculated with 10% vegetative inoculum from the 168 hour old seed flasks. These second passage flasks were then incubated on the Gump rotary shaker at 28° C. for 72 hours at which time growth was maximum or very heavy. The whole culture or mycelia from each flask were pooled and the pooled whole culture filtered through sterile frame press filter paper. The pooled filtered cells were re-suspended in and washed three times with sterile 0.01 M pH 7.0 phosphate buffer, decanting and discarding the supernate in each washing. The pooled phosphate buffer washed mycelia was then resuspended at the original cell volume in sterile 0.01 M pH 7.0 phosphate buffer and dispensed aseptically in sterile, cotton-plugged 500 ml. Erlenmeyer flasks at a level of 100 ml./flask. 11-acetylerythromycin B was then added in powdered form at a level of 0.05% (50 mg./100 ml. of washed cells suspension).

The flasks containing the washed mycelia (cells) were then returned to the Gump rotary shaker and incubated at 28° C. for 24 hours for optimal conversion of 11-acetylerythromycin B to erythromycin B. At that time the washed mycelia suspension from each flask were pooled and adjusted to pH 7.5 with NH$_4$OH. The pooled washed mycelia phosphate buffer suspension was then filtered through frame press filter paper. The filtrate was then concentrated from approximately 10 liters to 1.0 liter with a vertical evaporator under vacuum at approximately 30° C. The concentrated beer was then extracted twice with two volumes of methylene chloride. The methylene chloride extracts were then dried under vacuum. A 5.7 cm. diameter glass column was half filled with the mobile phase of the following solvent system: n-heptane: benzene:acetone:isopropyl alcohol:0.01 M pH 7.0 phosphate buffer (25:50:15:10:25). The column was then packed with 800 gm. of silica gel GF$^{254}$ previously moistened with the immobile phase of the above solvent system (0.9 ml./gm. of silica gel). The methylene chloride extract residue of the filtered, washed mycelia beer was then added to the top of the column and the column was developed with the mobile phase of the solvent system at a rate of about fifty 10 ml. fractions per 24 hours. The fractions containing reasonably pure erythromycin B were pooled and the antibiotic was crystallized from methylene chloride and hexane. The crystalline conversion product was identical to authentic erythromycin B by infra-red spectrum, and by the 100 MHz. NMR spectrum.

What is claimed is:

1. A microbial conversion method of converting an 11-acetylerythromycin B compound to an erythromycin B compound which comprises the steps of inoculating the culture *Streptosporangium vulgare* S–1 NRRL–2633 into a fermentation medium allowing sufficient time for growth, adding the 11-acetylerythromycin B substrate to the fermentation medium, allowing sufficient time in order to permit conversion to take place, and isolating the erythromycin B compound.

References Cited

FOREIGN PATENTS 2,021,430  11/1970  Germany _____ 260—210

A. LOUIS MONACELL, Primary Examiner

T. G. WISEMAN, Assistant Examiner

U.S. Cl. X.R.

195—30